United States Patent

[11] 3,629,743

[72] Inventor Jean-Claude Berney
Lausanne, Switzerland
[21] Appl. No. 886,448
[22] Filed Dec. 19, 1969
[45] Patented Dec. 21, 1971
[73] Assignees Compagnie des Montres Longines
Francillon S.A.
Saint-Imier, ;
Bernard Golay S.A.
Lausanne, Switzerland
[32] Priority Dec. 27, 1968
[33] Switzerland
[31] 19285/68

[54] OSCILLATING SYSTEM WITH MEANS FOR FREQUENCY VARIATION THEREOF
5 Claims, 6 Drawing Figs.

[52] U.S. Cl. ........................................................ 334/89, 331/117, 331/177, 334/14, 334/55
[51] Int. Cl. ........................................................ H03j 3/20
[50] Field of Search ............................................ 334/55, 14, 89; 331/117, 177, 175

[56] References Cited

UNITED STATES PATENTS

| | | | |
|---|---|---|---|
| 2,610,318 | 9/1952 | Clark ............................ | 331/177 |
| 3,393,379 | 7/1968 | Sanford ........................ | 331/117 |
| 3,414,826 | 12/1968 | Vandegraaf .................. | 331/117 |
| 3,451,012 | 6/1969 | Spiro ............................ | 331/117 |

*Primary Examiner*—John Kominski
*Attorney*—Imirie & Smiley

ABSTRACT: A device for varying the resonance frequency of an oscillating system, comprising a condenser coupled to said system by means of an electronic two-way switch, open and closed condition of this switch being controllable in such a way that the apparent value of the condenser and thus the resonance frequency of said system may be shifted in accordance with the relation between the duration of closed and open condition of the switch.

INVENTOR.
JEAN-CLAUDE BERNEY
BY
Irvine, Smiley, Snyder & Bateman

OSCILLATING SYSTEM WITH MEANS FOR FREQUENCY VARIATION THEREOF

This invention relates to a device particularly for an electronic timepiece, comprising an oscillating system and electronic means for varying at least one reactive component of said oscillating system.

Prior devices for obtaining an appreciable variation of a capacity have a fixed capacity $C_s$ connected to the terminals of the oscillating system, this capacity being series-connected with a variable electronic resistor $R_s$. However, when analyzing the equivalent parallel impedance of this circuit it is found that besides the variable capacity $C_p$ a parallel resistance $R_p$ exists, whereby $$C_p=\frac{C_s}{\omega^2 Cs^2 Rs^2+1}$$

$$R_p=\frac{1}{\omega^2 C_s^2 R_s}+R_s$$

This parallel resistor is detrimental for the Q-factor of the oscillating system and consumes energy. Therefore, such a device is practically unsuitable for an electronic timepiece, particularly a timepiece for a wrist watch, where the available energy is extremely limited and high Q-factors are required.

It is an object of this invention to provide a device providing for appreciable variation of the value of the capacity at a theoretically infinitely high Q-factor and without energy losses.

The device according to this invention broadly comprises means including at least one capacity series-connected with an electronic two-way switch and a control circuit for periodically closing said switch during a time interval of which the duration may be changed for varying the mean apparent value of said capacity and consequently the resonance frequency of said oscillating system. When the switch is in open condition, the current in the same is practically zero, and when the switch is in closed condition, the voltage across the switch is practically zero. In either case the power dissipation in the switch is practically zero contrary to the conditions in prior devices, where a variable resistance is series-connected with the capacity. In this way it is possible to shift the resonance frequency of an oscillating system, for instance of an parallel oscillating circuit, without reducing its Q-factor.

Figure 1:
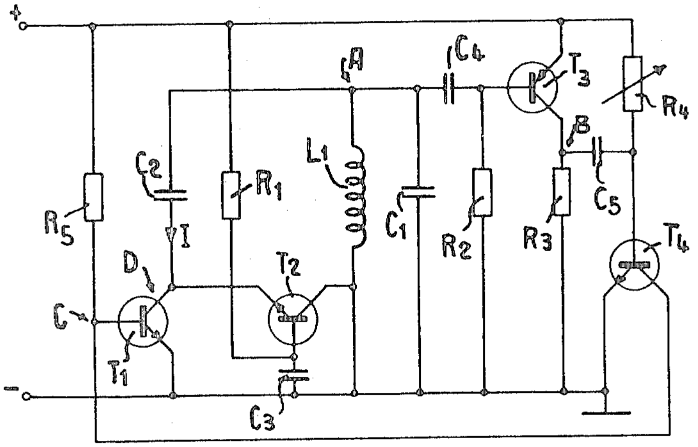
Figures 2A, 2B, 2C, 2D, 2I:
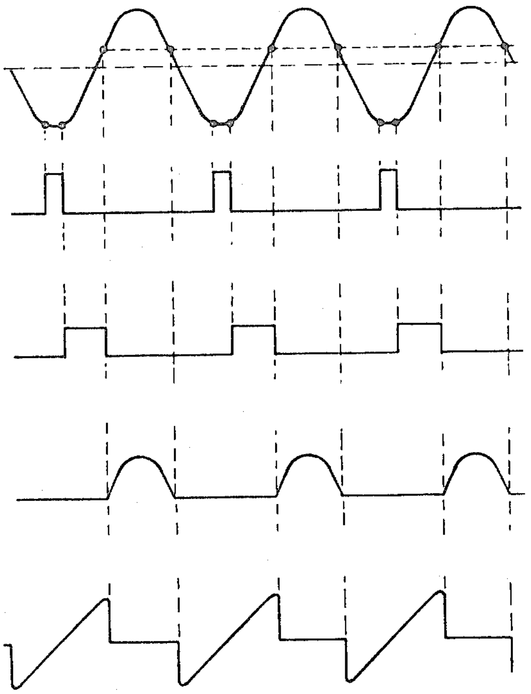

One embodiment of this invention will now be described by way of example with reference to the accompanying drawing wherein FIG. 1 is an electrical diagram of the embodiment and FIGS. 2A, 2B, 2C, 2D and 2I illustrate signals appearing in various points of the circuit shown in FIG. 1.

The illustrated circuit comprises a parallel oscillating circuit constituted by a coil L1 and a capacity C1. This oscillating circuit is coupled to a two-way switch formed by transistors T1 and T2 by means of a condenser C2. Transistors T1 and T2 are connected in parallel with opposite polarity of their emitter-collector circuits. The base of transistor T2 is maintained at a positive direct potential by means of a resistor R1 and a condenser C3.

By means of a condenser C4 the oscillating circuit L1, C1 is coupled to the input of a class C amplifier constituted by a transistor T3 and resistors R2 and R3. This amplifier is followed by a timing unit C5, R4, T4 and R5. This timing unit controls the base of transistor T1 of the two-way switch. Oscillation of the circuit L1, C1 may be sustained by suitable means not shown in the drawing.

FIG. 2 illustrates characteristic voltages appearing in this circuit. The sinusoidal voltage shown in diagram A of FIG. 2 appears in point A of the circuit, that is, at the terminals of the oscillating circuit L1, C1. Transistor T3 is turned on for a relatively short time by the peaks of the negative half waves of this voltage in point A, such that the pulses illustrated in diagram B of FIG. 2 periodically charge condenser C5 through the base-emitter circuit of transistor T4. According to the value of potentiometer R4 the transistor T4 is then maintained in non-conducting condition during a longer or shorter interval and thus produces a positive control pulse of adjustable duration (diagram C of FIG. 2) at the base of transistor T1. As long as positive control pulses are applied to the base of transistor T1, this transistor is in conducting state.

Since transistor T2 always remains conducting in one direction, the potential in point D of the circuit cannot become negative. Consequently, the switch T1, T2 always closes automatically by current flow in transistor T2 when the voltage across its terminals passes through zero towards a negative value, this being so during the negative current pulses flowing in the switch and condenser C2 (diagram I in FIG. 2). The duration of closed condition of the switch T1, T2 during positive half waves of the voltage at the terminals of the switch depends on the duration of the control pulses applied to the base of transistor T1. Such positive half waves of the voltage across the switch T1, T2 begin when the voltage at the terminals of circuit L1, C1 passes through its negative peak value or maximum, that is, when that voltage passes through its maximum of the polarity of conduction of transistor T2. This means that transistor T1 turns into conducting state by a pulse (C) whenever the voltage at its terminals passes through zero. The switch T1, T2 remains closed by conduction of T1 a time interval of twice the duration of the control pulses at the base of transistor T1. This time of closure is symmetrically distributed with respect to the pulse delivered by T3. The duration of the control pulses may be increased until transistor T1 remains conducting during the full half wave. On the other hand the duration of the control pulses may be reduced such that transistor T1 always remains cut off, that is, the switch T1, T2 always remains in open condition for the full period of the oscillation. It is thus possible to change the ratio open condition/closed condition of the switch from 0 to ∞ by adjusting the time constant of the timing unit C5, R4. The apparent capacity value of condenser C2 may thus be changed between 0 and the real value of C2. According to this apparent value of C2 as compared with the value of C1 the resonance frequency of the oscillating, circuit may be shifted within a more or less wide range.

In the embodiment illustrated in FIG. 1 it is assumed that the duration of the control pulses for the switch T1, T2 may be adjusted manually by means of potentiometer R4. However, variation of this value may be obtained by electronic means, for instance by a suitable transistor controlled by an input signal. Preferably the ratio open condition/closed condition of the switch T1, T2 may be controlled by a system belonging to a regulating circuit. The illustrated circuit may be built up at least partially by means of integrated circuits. The circuit is of particular interest for time-measuring systems, where the frequency of a low-frequency oscillator or audiofrequency oscillator may be controlled by any desired control system. As an example, the frequency of the oscillator may be controlled in accordance with the phase between the oscillation of this oscillator and a standard oscillation, for instance the oscillation of a quartz.

This invention is not limited to fully electric systems of the type shown in FIG. 1, but the oscillating system may be a combined mechanical and electrical system or even a purely mechanical system. Any desired mechanical resonator, such as a tuning fork, may be coupled to the variable reactance by means of an electromechanical transducer. Since the mechanical values of the resonator may be indicated by equivalent electrical values, the resonance frequency of a combined system comprising a mechanical resonator may be varied in the same manner as the fully electric system illustrated in FIG. 1.

Instead of the switch T1, T2 illustrated in FIG. 1 any other suitable switch and control circuit for the same may be used provided that control of the switch is feasible in such a manner that the switch is at any time fully open or fully closed.

Instead of regulating the frequency of an oscillating circuit LC or of a mechanical resonator, the frequency of an RC-oscillating system or any other combined system comprising mechanical and electrical elements determining the frequency, may be regulated in the same manner.

While the invention is of particular interest for time-measuring purposes, it may also be used in any other technical or scientific field.

I claim:

1. A device, particularly for an electronic timepiece, comprising an oscillating system and electronic means for variation of at least one reactive component of said oscillating system, said means including at least one capacity series-connected with an electronic two-way switch and a control circuit for periodically closing said switch during a time interval of which the duration may be changed for varying the mean apparent value of said capacity and consequently the resonance frequency of said oscillating system, said control circuit comprising pulse forming means controlled by said oscillating system at the frequency of the same and means for varying the duration of pulses from said pulse forming means.

2. A device according to claim 1, wherein said switch has two semiconductor elements of which the one continuously short-circuits voltages of a first polarity while the other element short-circuits voltages of the other polarity when receiving a control signal from said control circuit, this control circuit being in signal transmitting condition from the moment of passage of the voltage at the oscillating system through its maximum of a pulse of said first polarity, and means in said control circuit for adjusting the duration of said control signal.

3. A device according to claim 1, wherein said control circuit has a timing unit controllable by pulses synchronized by said oscillating system, the ratio of durations of open condition and closed condition of said switch being controlled by said timing unit.

4. A device according to claim 1, comprising means for varying the duration of closed condition of said switch using a potentiometer.

5. An oscillating system having a resonance at a natural frequency determined by reactive circuit components and adapted to oscillate at said natural frequency, reactive modulating means connected to said oscillating system with a controllable electronic two-way switch series-connected with said reactive modulating means, said two-way switch comprising two semiconductor elements connected in antiparallel condition with said elements conducting in opposite direction and one of said elements being connected for continuous conduction whenever a potential in its conducting direction is applied thereto while the other element is connected to a control circuit comprising a pulse generator connected to and synchronized by said oscillating system and a pulse modulator for modulating the pulse duration, said other element being under control of output pulses of variable duration from said pulse modulator for varying the ratio of conducting and nonconducting condition of said switch, whereby the apparent value of said reactive modulating means is changed for varying the natural frequency of said oscillating system.

* * * * *